(12) United States Patent
Rahman et al.

(10) Patent No.: US 7,389,029 B2
(45) Date of Patent: Jun. 17, 2008

(54) PHOTONIC WAVEGUIDE STRUCTURES FOR CHIP-SCALE PHOTONIC INTEGRATED CIRCUITS

(75) Inventors: Anis Rahman, Hummelstown, PA (US); Donald Tomalia, Mt. Pleasant, MI (US)

(73) Assignee: Applied Research and Photonics, Inc., Harrisburg, PA (US)

( * ) Notice: Subject to any disclaimer, the term of this patent is extended or adjusted under 35 U.S.C. 154(b) by 235 days.

(21) Appl. No.: 10/710,303

(22) Filed: Jul. 1, 2004

(65) Prior Publication Data
US 2005/0002628 A1 Jan. 6, 2005

Related U.S. Application Data

(60) Provisional application No. 60/481,056, filed on Jul. 3, 2003.

(51) Int. Cl.
*G02B 6/10* (2006.01)
(52) U.S. Cl. .......................................... 385/129
(58) Field of Classification Search ................ 385/129
See application file for complete search history.

(56) References Cited

U.S. PATENT DOCUMENTS

| | | | |
|---|---|---|---|
| 4,973,429 A | 11/1990 | Decher et al. | |
| 5,208,111 A | 5/1993 | Decher et al. | |
| 5,313,536 A * | 5/1994 | Rossi et al. | 385/14 |
| 6,051,372 A | 4/2000 | Bayrel et al. | |
| 6,710,366 B1 * | 3/2004 | Lee et al. | 257/14 |
| 6,720,093 B2 | 4/2004 | Samuel et al. | |
| 6,882,782 B2 * | 4/2005 | Conzone et al. | 385/49 |
| 7,232,650 B2 * | 6/2007 | Leatherdale et al. | 430/321 |
| 2003/0010987 A1 * | 1/2003 | Banin et al. | 257/82 |
| 2003/0024274 A1 | 2/2003 | Cho et al. | |
| 2004/0105610 A1 | 6/2004 | Rahman | |
| 2006/0158230 A1 | 7/2006 | Rahman | |

OTHER PUBLICATIONS

K. Okamoto "Fundamentals of Optical Waveguides, Ch. 9", Academic Press, New York, 2000.
K. M. A. Rahman, C. J. Durning, N. J. Turro and D. A. Tomalia, "Adsorption of Poly(amido amine) Dendrimers on Gold," *Langmuir* 2000, 16, 10154-10160.
A. Otomo, S. Otomo, S. Yokoyama, T. Nakahama, and S. Mashiko, "Remarkable optical properties of dendrimers for laser applications," in Linear and nonlinear optics of organic materials, Eds. M. Eich and M. G. Kuzyk, Proceedings of SPIE vol. 4461, 180-187, 2001.

(Continued)

*Primary Examiner*—Ellen E. Kim

(57) ABSTRACT

The present invention discloses a photonic waveguide that is based on natural index contrast (NIC) principle and also discloses fabrication details thereof. Such waveguide forms the basis of a class of chip-scale micro- and nano-photonic integrated circuits (PICs). The NIC method utilizes the built-in refractive index difference between two layers of dielectric thin films of two materials, created from nanomaterials that are designed for optical waveguide applications. This new class of waveguides simplifies the PIC fabrication process significantly. Based on the NIC based waveguides, which by design possess multiple photonic functionalities, PICs can be fabricated for a number of photonic applications such as arrayed waveguide grating (AWG), reflective arrayed waveguide grating (RAWG), interleaver, interferometer, and electro-optic sensor. Additionally, several other PICs can also be fabricated via tiers of integration, such as triple-phase integration where multiple optical functionalities are monolithically integrated on a chip.

39 Claims, 7 Drawing Sheets

OTHER PUBLICATIONS

A. K. Y. Jen, H. Ma, T. Sassa, S. Liu, S. Suresh, L. R. Dalton, and M. Haller, "Highly efficient and thermally stable organic/polymeric electro-optic materials by dendritic approach," in Linear and non-linear optics of organic materials, Eds. M. Eich and M. G. Kuzyk, Proceedings of SPIE vol. 4461, 172-179, 2001.

G. Decher, "L'Interfaçage macromoléculaire: nouveaux matériaux par nanoassemblage," Conference du Maercredi 12 Fevrier 2003.

C. Pitois, R. Vestberg, M. Rodlert, E. Malstrom, A. Hult, and M. Lindgren, "Fluorinated dendritic polymers and dendrimers for waveguide applications," in *Opt. Matls.*, vol. 21, 499-506, 2002.

* cited by examiner

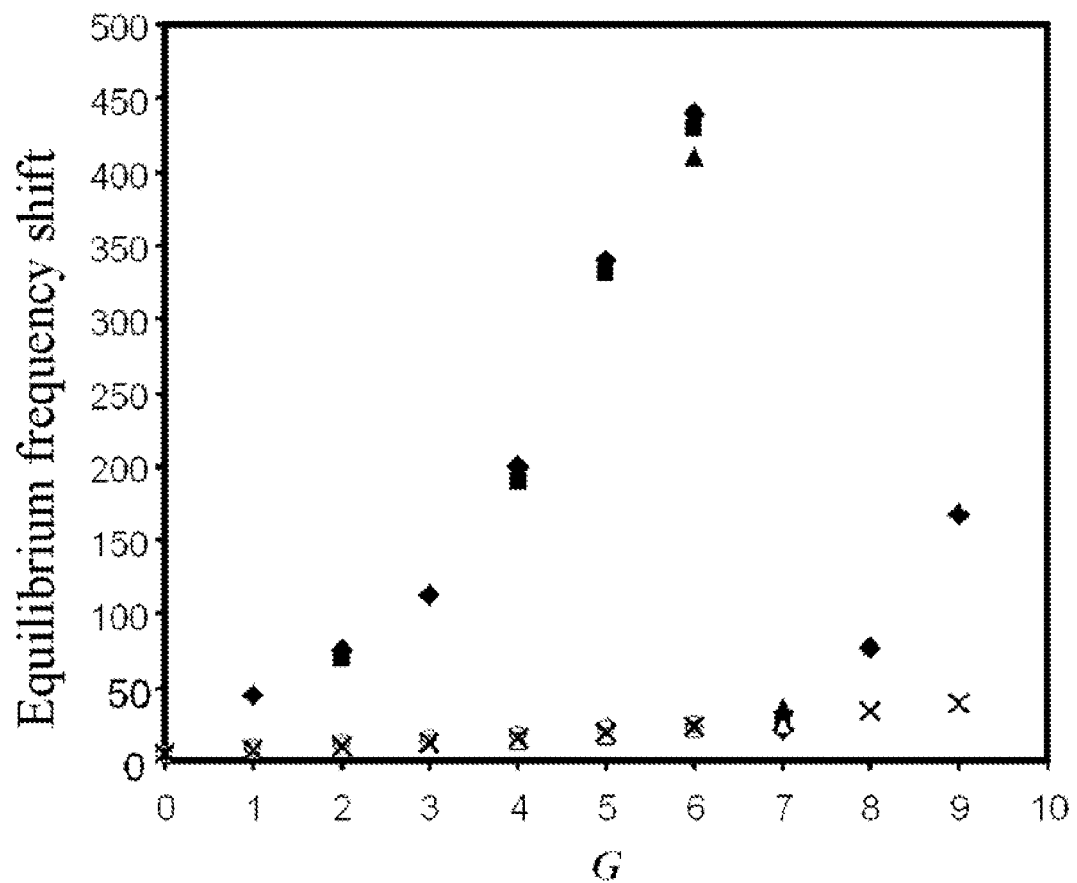
Fig. A  Symbols ◆▲■ corresponds to measured data. All other symbols corresponds to different model fitting.

PHOTONIC WAVEGUIDE STRUCTURES FOR CHIP-SCALE PHOTONIC INTEGRATED CIRCUITS

BACKGROUND OF THE INVENTION

1. Field of Invention

The present invention relates to a method of fabricating micro- and nano-photonic waveguides based on natural index contrast (NIC) principle for guiding and amplifying optical signal in 1060 nm-1600 nm range. Here a nano-material film of known refractive index (material A) is deposited on a substrate to form a base zone of uniform thickness. Another nano-material film of slightly higher refractive index (material B) is then deposited on top of the base zone. This second material zone, also of uniform thickness, is subsequently patterned to form the core of individual waveguides. A third crust of material A is then deposited on the same substrate on top of the second film that is already patterned into a number of ridges. The patterned layer (material B) thus buried between the first and the third zone (material A) forms the core, while the first and third layers together form the cladding of the waveguide. The whole structure forms a planar waveguide that is suitable for processing and amplifying light in the optical communication range. The present invention also relates to a method whereby the said waveguide serves as the basic element to construct nanophotonic integrated circuit that has application in a number of photonic devices that are important for data-communication, computing, and sensing.

2. Background

Photonic waveguide is the fundamental element for nanophotonic integrated circuits (nPICs) or, in general, photonic integrated circuits (PICs). In addition to PICs, photonic waveguides have a number of applications in sensors, spectrometry, interferometry, and other devices where guided light in a narrow dimension plays a crucial role. For instance, fiberoptic communication systems need highly sophisticated guided wave optical networks. Future high bandwidth, high speed communication environments and the next generation of Internet will need ultracompact, lightweight, low-power, low-loss, and low-cost wavelength division multiplexer, demultiplexer, wavelength router, splitter, coupler, interleaver, optical amplifier, modulator, and other photonic devices. Such technologies in turn require advances in design of ultracompact micro- and nano-photonic structures, with design and engineering of the electromagnetic properties of materials in the scales comparable to the wavelength of information carrying light. Therefore, a capability of fabricating high quality, robust, cost-effective, photonic integrated circuits is important for the next generation fiberoptic communication, computing and sensing.

Photonic waveguides are the basic constituents of photonic integrated circuits (PICs) that are somewhat analogous to the transistors in the electronic ICs. Although the physics of photon (a neutral wave/particle) and electron or hole (charge carrying particles) are different that make an exact comparison between the PIC and electronic IC difficult, nevertheless, waveguides can be designed to process optical signal in as much as transistors can process electronic signals. Confining the focus on photonics for the purpose of present discussion, it is widely known that in the current practice, most photonic components are based on discrete technology where individual elements perform a single function. The thin-film interference filter, also called dielectric thin-film filter (TFF) is an example of a discrete technology; here n-different TFFs are cascaded to demultiplex n-different wavelengths of a multiplexed signal. Because of the discrete nature, the plurality of elements, that are necessary to perform a single function, are assembled together by mechanical means. An example of the situation may be cited again in terms of the TFF. In this case an external fiber carrying the multiplexed signal is interfaced to the TFF by means of a GRIN lens; the method of such interfacing is very complex in itself. The output signal from the TFF again needs to be focused on another external fiber by means of a second GRIN lens. This process needs to be repeated for every wavelength; as a result the discrete technology based modules are bulky, lossy, and performance limited. Moreover, poor yield of the discrete component's assembly process is a cause of their higher cost.

While recently the integrated approach is drawing significant interest, current integrated technologies also suffer from limitations of materials, processing, and performance. For instance, in glass based waveguides, refractive index variation is produced by doping glass with a suitable dopant. The doping is usually done by a diffusion controlled process. Such process is difficult, performance limited and the machineries dedicated to carry out these processes are expensive and not easily amenable for expansion. Other processes such as flame hydrolysis or ion-exchange methods are also complicated, difficult to control, and enjoy partial success. Thus, there is a need to find more efficient methods to produce smarter, robust, and precise photonic waveguides.

The optical waveguides formed on a silicon wafer can be designed to perform many important optical signal processing. A common application is an optical multiplexing and demultiplexing on a chip that is commonly known as photonic integrated circuit (PIC), also as planar lightwave circuit (PLC). A popular application of PICs is an arrayed waveguide grating (AWG) or a reflective arrayed waveguide grating (RAWG). However, waveguides can be designed to perform a number of optical functions such as amplification, modulation, switching, sensing, and other optical signal processing, thus allowing itself to be analogous to a transistor that forms the basis of electronic integrated circuit (IC). Also, using waveguides as the basic building block, a number of PICs can be constructed to carry out various photonic signal processing and the PICs can also be used as a platform for a number of photonic devices essential for fiberoptic communication and computing. Example of such applications includes wavelength router, tunable optical add/drop multiplexer, tunable attenuator, optical interconnect, interleaver, optical power splitter, coupler, and other waveguide based devices.

DESCRIPTION OF PRIOR ART

Present methods of fabrication of photonic waveguide (also referred to as planar waveguide in the literature) are complicated. The most common methods include ion exchange method such as the one described in U.S. pat. no. 0024274A1 (Feb. 6, 2003) titled "method of manufacturing a planar waveguide using ion exchange method;" thermal diffusion methods cited therein; and flame hydrolysis deposition (FHD) method such as the one described in "Fundamentals of Optical Waveguides," (Ch. 9) K. Okamoto, Academic Press, New York, 2000. These methods are inherently complicated and devices produced from the waveguides fabricated by these methods are performance limited.

FHD process requires a high temperature. A glass precursor is supplied in the form of gas and glass particles are produced by an oxy-hydrogen flame that is deposited on a substrate. These glass particles then need to be consolidated (i.e., melted and re-solidified) at a high temperature. Because the precursor is delivered in the form of gas, and the proportion of dopant precursor determines the concentration of dopant in glass, it is difficult to control the processing factors. As a result, the refractive index may suffer from non-uniformity across the thickness of the deposited layer; hence, a sharp boundary between the glass-layers of two different refractive indexes is difficult to obtain, causing a poor quality of the waveguides.

The ion exchange method requires very high electric field to move (inject) the dopant ions into a glass substrate where the upper layer's refractive index is modified by exchanging the native ions with the dopant ions acting as a modifier. A solution phase method is also available for ion exchanging. However, ion exchange method suffer from limitations that it cannot precisely control the dimensions of the waveguide and does not form a sharp demarcation line between the refractive indices of the core and the cladding. This is more problematic in case of solution phase diffusion of ions into the substrate because the ions can diffuse in all directions. In the absence of a directional characteristic of the ion exchange as governed by the concentration gradient of the diffusing ions, there exists a gradient distribution of the exchanged ions in the glass from the exchange center. Due to these problems, the ion exchange method is not efficient to control the waveguide properties with a sharp step refractive index between the core and the cladding.

In general, existing methods of producing photonic waveguides suffer from performance limitation and ease of fabrication. Moreover, these methods require expensive and dedicated machineries that are not easily amenable to different materials system and/or processes.

SUMMARY OF THE INVENTION

In this disclosure a new class of photonic waveguide is described that are based on the natural index contrast (NIC) principle. This method simplifies the refractive index differential requirements between the core and the cladding of waveguide. This technique also provides a means of incorporating amplifying ions within the waveguide core to make it an amplifier, as well as incorporating impurities such as chromophores to enhance the electro-optic properties of the waveguide. The NIC based waveguide forms the basis of a class of chip-scale photonic integrated circuit where different functionalities are fabricated on a single chip and are connected via on-chip waveguide interconnects. This new waveguide technology enables development of low cost, light weight, nanophotonic systems by utilizing the NIC effect of dendrimer, nano silica, spin-on glass, other nanomaterials and compositions of the said materials. This technology can be implemented on number substrates such as silica, glass, quarts, plastic, polyimide, etc, which may be hard and non-flexible as well soft and flexible. Further, a number of photonic integrated circuits (PICs) can be designed based on the NIC based waveguides for optical signal processing and optical amplification, optical modulation, and wavelength routing. In general, the NIC value is given by $$\Delta n = \frac{n_2 - n_1}{n_1} \times 100,$$

where $n_1$ is the refractive index of cladding layer and $n_2$ is the refractive index of the core layer. Here we propose the term "silicon for photonics" to describe dendrimer's multifunctional optical properties that are similar to silicon's multifunctional properties for electronic IC fabrication.

PREFERRED EMBODIMENT

Natural Index Contrast Effects

Here we describe the natural index contrast principle for waveguide formation and fabrication. When two layers of two different materials are brought in contact of each other at an interface, there exists an energy difference similar to the energy levels produced in a semiconductor by dopant atoms. In case of dielectric thin films of two different materials, one laid down or formed on top of another (without any air gap), there will be a difference in refractive index (RI) between the two layers. Light, incident at an appropriate angle on these layers, will bend towards the higher RI material at the interface (the total internal reflection). When a higher RI material is completely enclosed in a lower RI material, incident light will propagate within the enclosed region thus forming a waveguide, similar to a step index optical fiber. The guiding layer is called the core and the surrounding layer is called the cladding. In the NIC principle, refractive index difference between the core and cladding layers are pre-built by materials design. This allows more flexibility to tailor waveguiding requirements for multiple photonic functionalities.

Existing methods for fabricating waveguides are mostly based on glass based materials where expensive equipments are necessary for deposition, doping, and patterning, as mentioned in the previous section. For waveguiding purposes these materials must be doped with suitable dopants to produce refractive index contrast; for which currently no easy alternatives available.

The present invention discloses an alternative method where built-in refractive index difference of compatible materials is used to form the waveguide core and cladding, thus avoiding direct doping of glasses. This method, called the natural index contrast (NIC) method is an attractive alternative for photonic waveguide design. Here the materials are matched to form the core and the cladding utilizing the built-in index contrast. This eases a big hurdle of controlling the RI via doping methods. The NIC method offers a straightforward solution to produce a step index profile with the possibility to expand to graded index profile as well, while fabrication is significantly simpler than contemporary methods. Since the PICs are based on step index waveguides, NIC method is suitable for a number of PIC based devices. The concept is applicable to any photonic waveguide design where the built-in refractive index contrast is suitable for waveguiding from a chosen set of material. The present invention focuses on waveguides suitable for guiding light in the range of 1060 nm and 1650 nm.

Dendrimers for Photonics Development

What distinguishes dendrimers from other materials is the fact that it offers properties similar to dielectric materials in a polymeric form. Dendrimers are a novel class of three-dimensional nanoscale, core-shell molecules that can be precisely synthesized for a wide range of applications. Building on a central core molecule, dendrimer molecules are formed by the step-wise, sequential addition of concentric shells consisting of branched molecules and connector groups. Each branched shell is referred to as a generation. Up to ten generations can be incorporated into a single dendrimer molecule, thus allowing a wide range control of the size and number of functional groups of each molecule. Some important properties of this class of polymers can be found at the DNT web at http://dnanotech.com/properties-.html.

Dendrimers are also monodispersed polymers with nearly perfect spherical molecular architecture [see for example "Adsorption of Poly(amido amine) Dendrimers on Gold," by K. M. A. Rahman, C. J. Durning, N. J. Turro and D. A. Tomalia, Langmuir 2000, 76, 10154-10160] with dimensions ranging from 1.4 nm (G0) to 11.4 nm (G9) [e.g., see "Molecular Dynamics of PAMAM Dendrimers," by K. M. Anis Rahman, ChristopherJ. Durning and Nicholas J. Turro, http://dwdm2.home.comcast.net/pamamdynamics.pdf]. This nanostructured polymer is drawing increasing attention for photonic applications such as solid state laser [see for example "Remarkable optical properties of dendrimers for laser applications," by A. Otomo, S. Otomo, S. Yokoyama, T. Nakahama, and S. Mashiko, in Linear and nonlinear optics of organic materials, Eds. M. Eich and M. G. Kuzyk, Proceedings of SPIE vol. 4461, 180-187, 2001], electro-optic usage [see for example "Highly efficient and thermally stable organic/polymeric electro-optic materials by dendritic approach," by A. K. Y. Jen, H. Ma, T. Sassa, S. Liu, S. Suresh, L. R. Dalton, and M. Haller, in Linear and nonlinear optics of organic materials, Eds. M. Eich and M. G. Kuzyk, Proceedings of SPIE vol. 4461, 172-179, 2001], and organic light emitting devices (OLED) [see for example U.S. Pat. No. 6,720,093 B2 (Apr. 13, 2004) titled "Light-emitting dendrimers"]. Because of their highly organized structure, deposited dendrimers are convenient for photonics fabrications. Dendrimer film can be patterned by simpler process such as photolithography or reactive ion etching (RIE). While there is a tremendous potential for dendrimers to serve as a smart material platform for optical components and PICs, such development activities are mostly an unexplored area. Because of its attractive properties, dendrimers can provide a viable alternative to common photonic materials (e.g., glass based materials).

It is known that dendrimers form smooth multilayer whose thickness can be controlled by manipulating the dendrimer generation and solution chemistry such as the pH and concentration. Such molecular multilayer film formation is driven by the mechanism of favorable electrostatic image-charge interaction between the positively charged dendrimer molecule in solution and the solid substrate. Some details of this mechanism are described by Rahman et al. (see Cite No. 8, (Non Patent Documents)) for deposition of dendrimer multilayer on smooth gold surface. It is assumed that the same mechanism will be responsible for Si-substrate, because, n-type Si wafers have an electron density similar to metallic substrates such as gold which will produce image-charge interaction. Also, experiments carried out by our group in collaboration with the Pennsylvania State University's Nanofabrication Facility (see http://www.nanofab.ps-u.edu) (unpublished) shows that dendrimers form smooth film of uniform thickness by spin-coating when casted from 10-50% methanolic solution. We also found that a uniform film of approximate thickness within the range 1 to 5 µm can be obtained from a single cast, whose actual thickness can be controlled by three factors. (i) Dendrimer generation: for example, generation zero (G0) will have the lowest thickness while generation six (G6) will have the highest thickness (see Cite No. 8, (Non Patent Documents), FIGS. 3 & 4 for data on gold substrate). (ii) Solution concentration: Higher the concentration, higher the film thickness and vice-versa. The lower and upper limits of the concentration for a uniform, smooth film will depend on dendrimer generation, spinning condition and solution pH, therefore, need to be determined individually for each generation of dendrimer. (iii) Spinning condition: In general higher the spinning speed, lower the film thickness; however, a minimum speed is required to maintain the film uniformity which need to be determined for a given generation, solution concentration, and viscosity.

It should be pointed out here that this method of molecular multilayer uniform film formation is different than other methods described by others such as a layer-by-layer approach used to build composite films where electrostatic interaction between anionic and cationic compounds is the main mechanism of such film formation (see for example "L'Interfaçage macromoléculaire: nouveaux matériaux par nanoassemblage," by G. Decher, in Conference du Maercredi 12 Fevrier 2003), or templating and layering methods described in U.S. Pat. No. 4,973,429 (Nov. 27, 1990) titled "Organic materials with non-linear optical properties," U.S. Pat. No. 5,208,111 (May 4, 1993) titled "One- or multi-layered layer elements applied to supports and their production," and U.S. Pat. No. 6,051,372 (Apr. 18, 2000) titled "Template induced patterning of surfaces and their reversible stabilization using phase transitions of patterned material."

Multifunctional dendrimer end groups as well as the center molecules are suitable for attaching foreign ions/molecules or nano-particles, thus providing a means by which its optical properties can be tailored. Because of these attractive properties, dendrimers are promising materials for photonic waveguide applications.

Photonic Integrated Circuit

As mentioned before, photonic integrated circuits (PICs) are analogous to electronic ICs where information processing is done by light signal. They are attractive vehicles for achieving high-speed fiberoptic communication systems on an integrated platform. The arrayed waveguide gratings (AWGs), a class of PICs, are higher channel count and low channel spacing building blocks for a number of vital applications for fiberoptic communication and computing. Especially, the PIC based reflective arrayed waveguide gratings (RAWGs) [see for example US pat. application No. 2004-0105610 A1 (Jun. 3, 2004) titled "Reflective Arrayed Waveguide Grating"] are particularly suitable for applications where smaller size and lower on-chip loss are important. For instance, on board computers of a space vehicle can be multiplexed by a RAWG based DWDM and then free-space optics or fiberoptic tether can be used to connect the nodes in a satellite constellation. Another application is in the short-haul and metro internet applications, where the PICs can be used for multiplexing and demultiplexing of the communication and computing signals at the central office and the user premises. A PIC based wavelength router can be used for high speed links at the short-haul and metro fiberoptic nodes.

The PIC is also the basic building block for a number of modules and systems that are essential parts of fiberoptic based communication and computing. The dense wavelength division multiplexing and demultiplexing (DWDM and DWDD) are the most basic applications. In DWDM and DWDD, these chips function as the heart of the system by performing multiplexing (MUX) and demultiplexing (DMUX). In addition, used as a "building block," a number of systems and modules can be built around these chips by integrating over multiple tiers such as triple-phase integration briefly described below [See in US pat. application No. 2004-0105610 A1 (Jun. 3, 2004) titled "Reflective Arrayed Waveguide Grating"].

The PIC described above is a first phase integration where the photonic waveguides are integrated on a substrate to perform passive (demultiplexing) functionalities. Another important application of these chips, at the first phase of integration, is the multi-channel tunable optical add/drop multiplexer (TOADM). Other common applications in the passive domain include multi-channel optical channel monitor, multi-channel tunable optical gain equalizer, multi-channel thermo-optic switch, multi-channel tunable optical attenuator, multi-channel sensors, etc.

At the second phase of integration, appropriate on-chip gain elements (e.g., $Er^{3+}$ doped waveguide amplifier) can be combined with these chips to produce the above mentioned PICs with low-loss and/or with a gain. This is important, because, optical transmission systems require frequent signal amplification and regeneration (also called repeater) that is expensive and adds complexity to system design. Ability to build systems with extremely low-loss and/or gain will simplify system design significantly. It will also eliminate the frequent need of signal regeneration, thus enabling significant cost savings and ease of deployment of fiberoptic systems.

The third phase of integration will allow combining the active elements such as laser-diodes or VCSELS and detector arrays with the above mentioned PICs to produce a line of optronic modules and systems. Examples include modulators, receivers, transmitters, transceivers, transponders, switches, fully built out DWDM systems, and wavelength router links.

Chip-scale Photonic Integrated Circuits

The objective of a chip-scale PIC is to produce a very concise device with multiple functionalities on a single substrate. Two different schemes are usually considered: (i) system-on-chip, and (ii) chip-scale packaging; both of these schemes actually complement each other. The triple-phase integration scheme, as described above, allows a PIC (e.g., a RAWG) to be further integrated over several phases to produce denser functionality on the same substrate. For instance, a RAWG monolithically attached with amplifying waveguide blocks allows controlling the loss factor. Further, lasers and modulators can be added to the RAWG to produce multichannel transmitters. One can then add detectors to add more functionality enabling transceivers, transponders, and switching on a chip as well. Finally, combined with CMOS processes, these PICs can be used to build self containing optical communication router. However, here we emphasize on monolithic integration, as opposed to hybrid integration where different elements are packaged together on a single substrate or in a single box.

NIC Based Waveguide

In this section we disclose methods of NIC based waveguide design from several nano-materials. In particular, we highlight dendrimer based waveguide. In addition, NIC based spin-on glass waveguide and dendrimer modified nano-material waveguide are also discussed. Further, the NIC based waveguides can also be designed from other materials where a natural index contrast suitable for guiding light in the near infra-red region exists, as shown in subsequent examples.

Dendrimer NIC Based Waveguide

It is known that dendrimer's molecular size can be controlled by its generation (see ref. 3 & 4). In addition to the size, the generation can also be used to control the refractive index of dendrimer thin film. Moreover, dendrimer thin film's refractive index within a given generation can be controlled by factors such as choice of center-molecule, shell-structure (substituent), and doping the molecule with alkali atoms via liquid phase chemistry. For the waveguide confinement zone (core) characterized by a higher refractive index (RI) that is covered by a cladding of slightly lower RI, dendrimers make a good choice. It has been reported that the fluorinated dendrimers have a RI in the range of 1.528-1.536 measured at wavelengths ranging from 1320 nm to 1550 nm [see "Fluorinated dendritic polymers and dendrimers for waveguide applications," by C. Pitois, R. Vestberg, M. Rodlert, E. Malstrom, A. Hult, and M. Lindgren, in *Opt. Matls*., vol. 21, 499-506, 2002], which is in the required range to serve as waveguide core.

FIG. A shows the equilibrium frequency shift at saturation corresponding to generation numbers (reproduced from ref 3). As can be seen from FIG. A, dendrimer film thickness increases exponentially as a function of generation for the first six generations. Because of the thickness variation and other molecular arrangement differences, refractive index also varies as a function of dendrimer generation, which forms the basis for what is termed as "natural index contrast" or NIC principle for waveguiding.

Further, dendrimers can also be doped with rare earth fluorescent molecules/ions to tailor its property for optical amplification and modulation while simultaneously satisfying the waveguiding requirements. Thus, there are several ways that appropriate waveguide core and cladding layers can be created from dendrimer, based on the NIC principle. For example, we measured the refractive index (RI) of spun-on, cured dendrimer films on silicon wafer using a Gaertner L116C ellipsometer. It was found that the RI of G0 film $n_0$=1.463 while the RI of G4 film $n_4$=1.511, exhibiting a NIC value of $$\Delta n = \frac{n_4 - n_0}{n_0} \times 100 = 3.28\%.$$

Thus one can use G0 film as the cladding and the G4 film as the core of the NIC based waveguide from dendrimer films. Once the refractive index of the respective layers are chosen (the NIC principle), then waveguides are fabricated by lithography and ion etching process described below.

Spin-on Glass NIC Based Waveguide

Spin-on glass is another set of materials that can be used to form NIC based waveguide fabrication. Commercial spin-on glass is available in several categories; many of these glasses possess properties suitable for waveguiding and are suitable for fabricating on silicon wafer. The basic composition of this group of glasses is an organosiloxane modified with additives to adjust the films physical properties. For example, phenyl-methylsilsesquioxane is a commercially available resin solution that forms uniform thin film on silicon wafer via spin-on method. This film cured at 325° C. exhibits a refractive index of 1.56. The refractive index of this film can be tailored by changing the phenyl content and/or by other additives such as dendrimer, allowing a route to design waveguide core and cladding via NIC principle. Once a NIC value suitable for waveguiding is established, the films are formed and processed via etching method described herein.

NIC Based Waveguide for Optical Amplification

Dendrimer or other NIC based waveguide can be used as an optical amplifier. Here the waveguide is formed with materials where the core is composed of amplifying ingredients and must also satisfy the core-cladding requirements. Dendrimer is a material that can be easily doped with fluorescing rare-earth metal ions via liquid phase chemistry such as chelating. Chelating can be used to directly attach rare-earth ions such as Erbium within the interior or exterior of dendrimer molecule or to surface groups such as amines. Typical reaction involves addition of an appropriate rare earth metal salt such as nitrate or acetate to a dendrimer solution allowing the rare earth cation to either directly exchange with the cation of a dendrimer salt, or exist as a chelated ion pair within the dendrimer structure. After reaction, unbound excess metal salts are removed from the system via common procedures for the isolation and purification of the dendrimer.

NIC based waveguide's amplification efficiency is proportional to rare-earth attachment level which will depend on the size and chelating condition of the specific dendrimer molecule. For example, with increasing dendrimer size (i.e., higher generation), the number of chelation sites per dendrimer molecule increases rapidly ($2^{n+2}$ for PAMAM dendrimer, where n is the generation number). The efficiency of metal attachment, therefore, is controlled by dendrimer generation and by loading (ppm) within a given generation. Higher fraction of rare-earth metal ions (<500 ppm) can be incorporated in dendrimer via solution phase method such as chelation. This ability culminates into a method of tuning the degree of amplification within a given length of the waveguide. The fluorescence wavelength can be tuned by choosing a suitable rare-earth metal. For example, Erbium will fluoresce in the 1500-1600 nm range, Neodymium will fluoresce in the 1060 nm range, Praseodymium will fluoresce in the 1250-1300 nm range, Thorium and Holmium will fluoresce in the 1300-1400 nm range, and Terbium will fluoresce in the 1400-1500 nm range.

NIC Based Waveguide for Optical Modulation

Dendrimer and/or other NIC based waveguide's core forming layer's dielectric properties can be modified via doping with high dielectric constant additives such as $CdGeAs_2$, $TlAsS_3$, $Ag_3AsS_3$, GeSe, $SrTiO_3$ or other suitable dopants. Thus the electro-optic properties of dendrimer can be tuned for optical modulation (see for example "Polymeric and dendritic electro-optic materials: Materials Issues," by L. R. Dalton, Univ. Washington, Seattle, Wash. 98195). While this report has dealt with chromophore doing in dendrimer, other additives such as the ones indicated above can also be incorporated in dendrimer to modify its electro-optic coefficients. Robust waveguide modulator can be fabricated from such modified dendrimer where the modulation depth and frequency can be tuned by specific additive and external excitation combination.

DESCRIPTION OF DRAWINGS

Brief Description of the Drawings

FIG. A shows the equilibrium frequency shift of different generations of PAMAM dendrimer which corresponds to film thickness of respective generation (reproduced from ref. 3).

Figure 1:
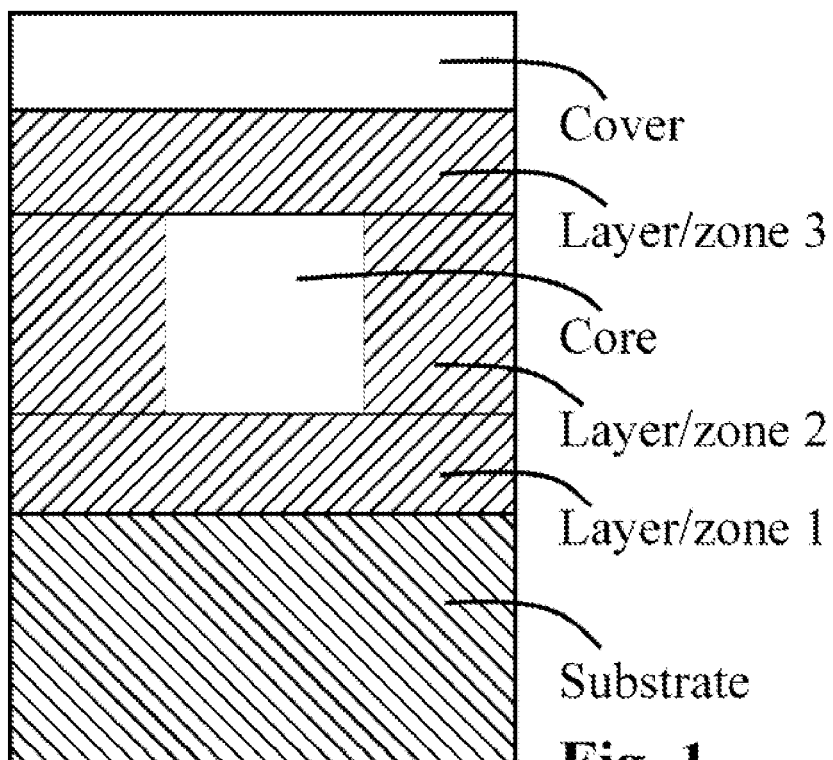

FIG. 1 shows a configuration of a NIC based waveguide on silicon substrate.

Figure 2:
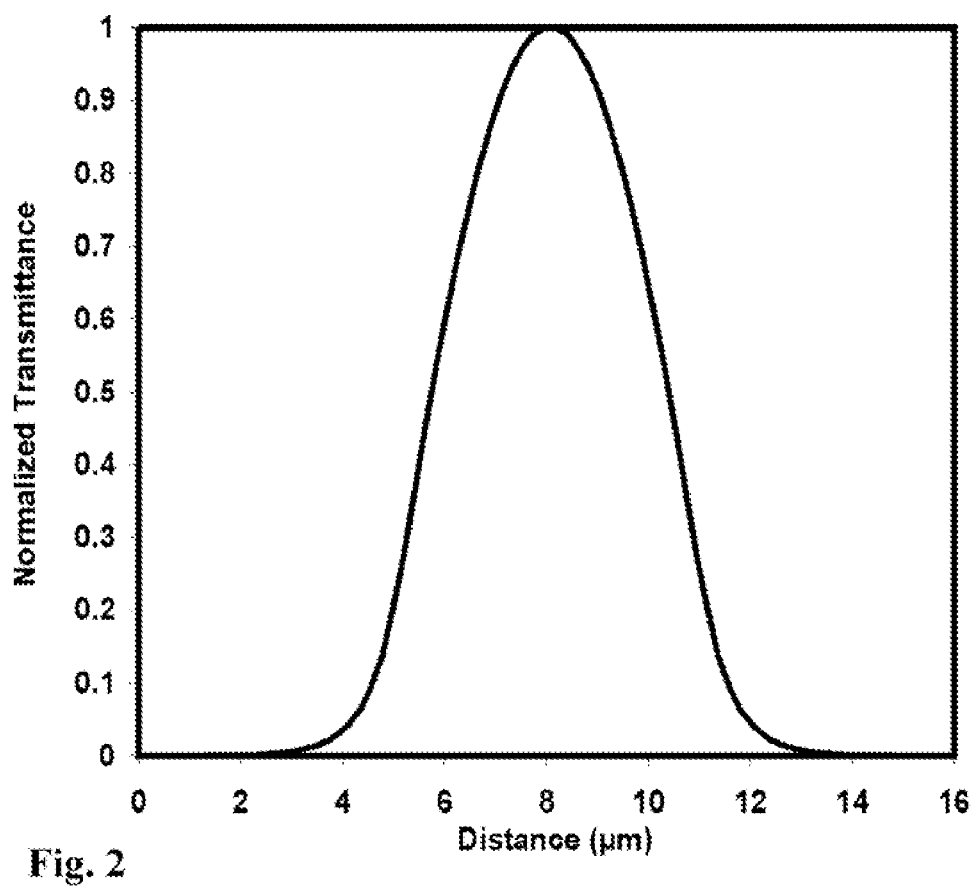

FIG. 2 shows the mode field plot of the waveguide obtained via simulation.

Figure 3:
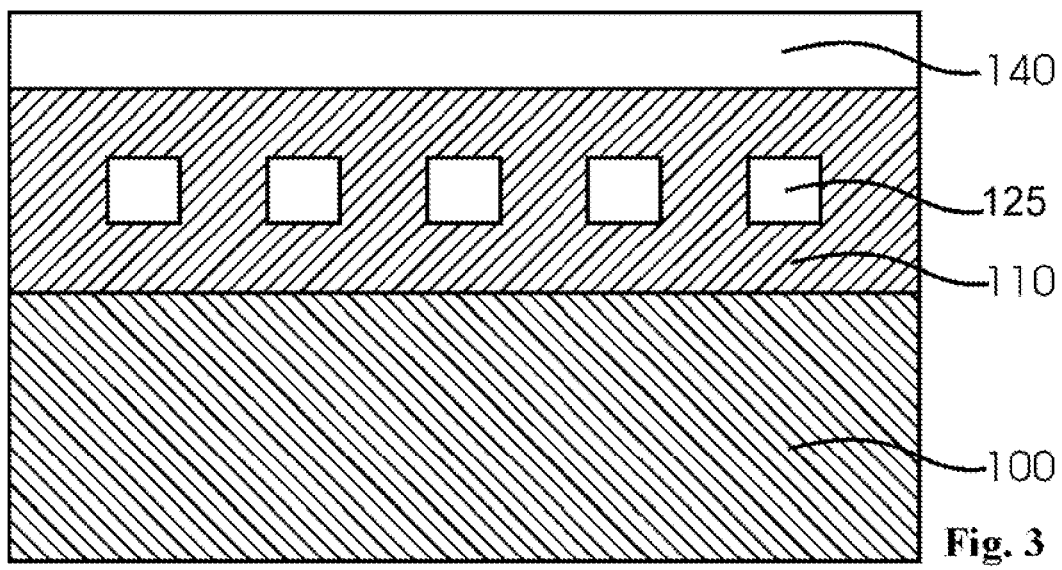

FIG. 3 shows a cross-section of the overall construction of several waveguides on a substrate.

FIGS. 4 through 10 are cross-sectional views of the waveguide at various stages of fabrication.

Figure 10:
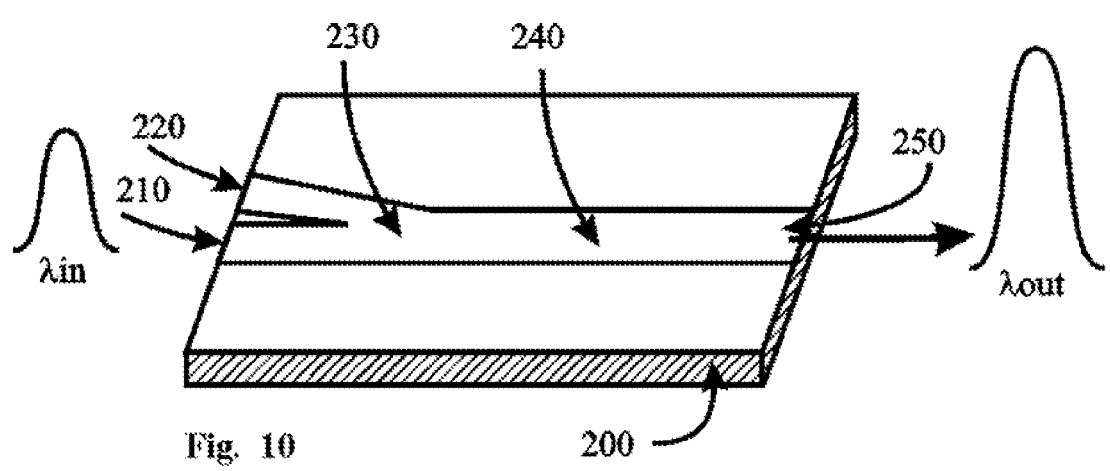

FIG. 10 shows the construction of a NIC based waveguide amplifier, while

Figure 11:
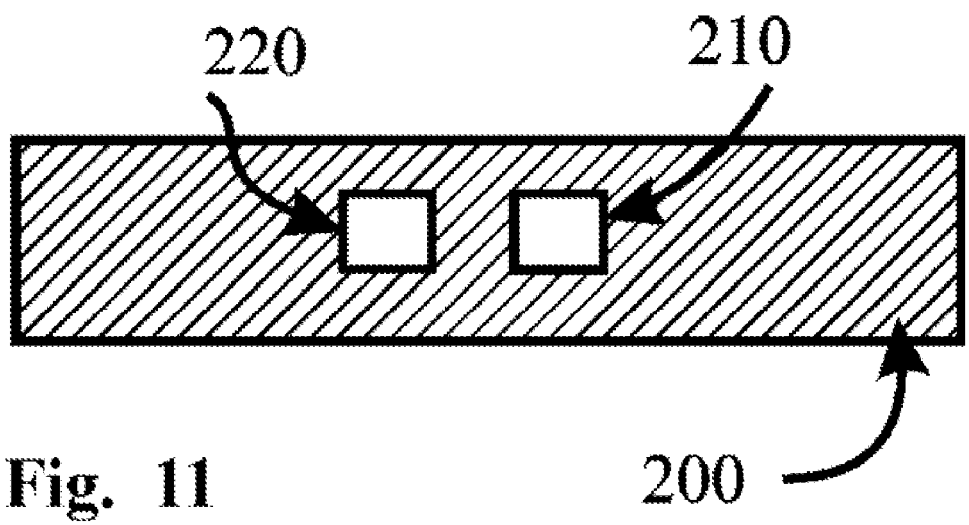

FIG. 11 is the side view of FIG. 10. The fabrication process of the present invention is described with the help of these figures.

Figure 12:
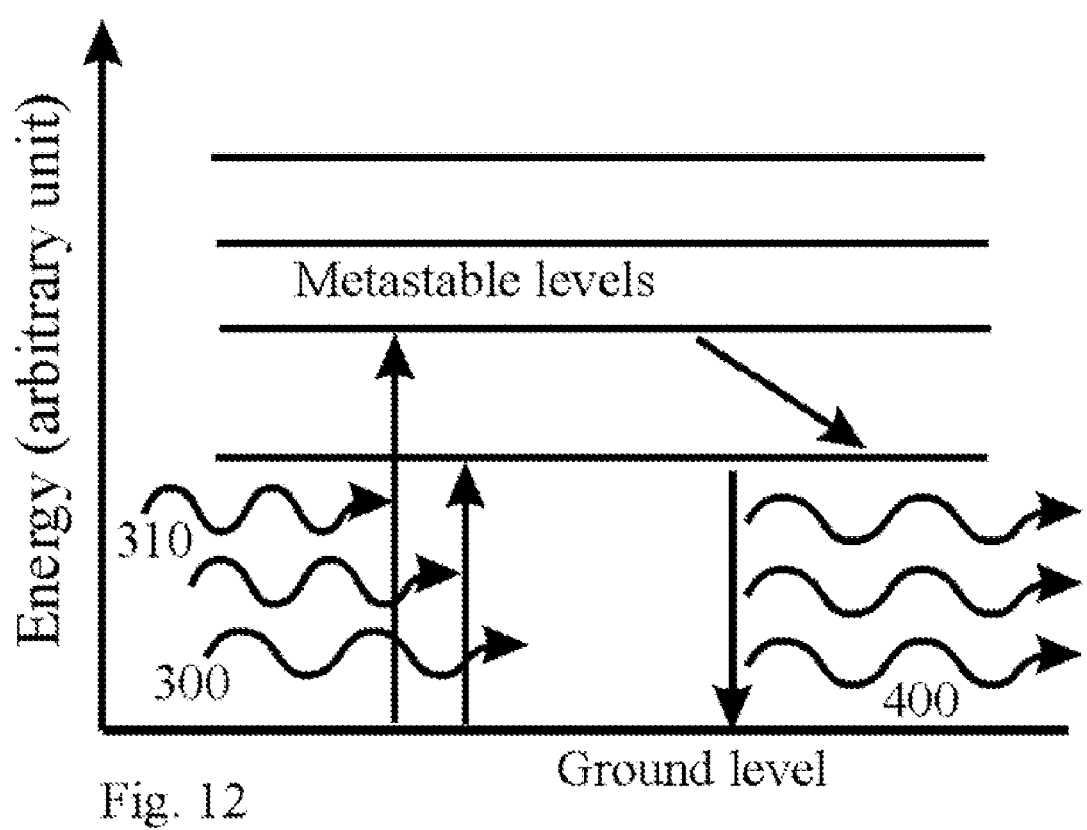

FIG. 12 shows a general energy level diagram with absorption and emission transition scheme.

TECHNICAL FIELD

Description of Preferred Embodiment

For the sake of clarity and for a better understanding of the invention, drawing as attached hereto are only a schematic representation of the preferred embodiments and certain characteristics thereof, but not drawn to scale.

FIG. 1 exhibits a configuration of a NIC based waveguide fabricated on silicon wafer (substrate). Here films or layers of nano-material are spun-on and patterned in successive steps. Layers 1, 2 & 3 are laid down from identical nano-material; as such these layers possess identical refractive index. The material for these layers is chosen such that it is suitable for a cladding corresponding to the chosen core material. FIG. 2 shows the normalized mode field plot obtained via simulation where the core is made of generation 4 (PAMAM G4) dendrimer ($n_4$=1.511) and cladding is made of generation 0 (PAMAM G0) dendrimer ($n_0$=1.463). The NIC value Δn=3.28% is suitable for guiding light in the near infrared region of 1060 nm to 1600 nm. Here a core dimension of 5×5 $\mu m^2$ was chosen.

Figure 4:
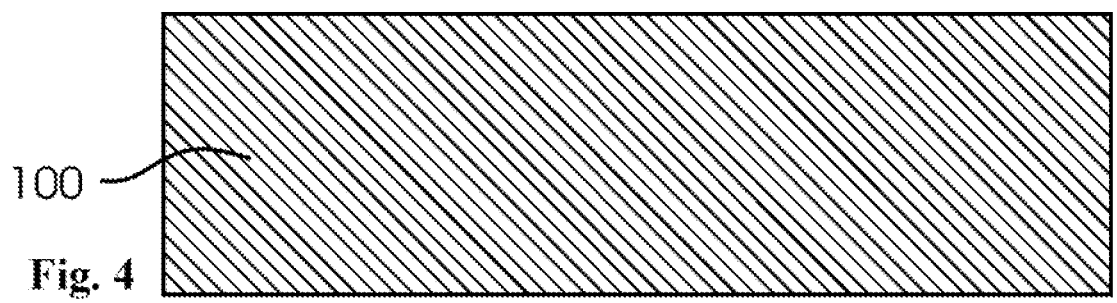
Figure 5:
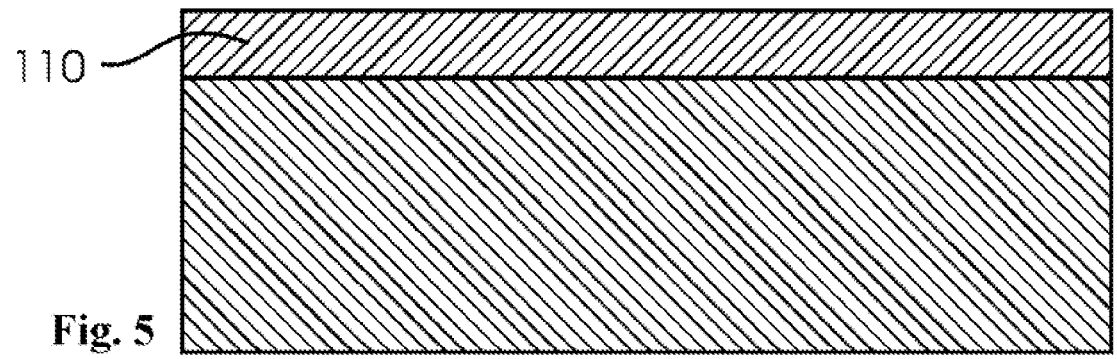

FIG. 3 shows a cross-sectional view of the overall waveguide construction where 5 different waveguide cores 125 are shown. FIG. 4 exhibits a cross-sectional view of a silicon (Si) substrate 100 on which a film 110 of uniform thickness has been formed via spin-coating (illustrated in FIG. 5) from a nano-material A. The Si substrate has a refractive index in the range 3.4 and 3.5 and the nano-material (e.g., PAMAM G0, G1, G2, or G3) film has a refractive index between 1.4 and 1.5. However, material A could also be chosen from other nano-materials such as nano-silica or spin-on glass whose refractive index will fall in the range 1.4 and 1.5.

Figure 6:
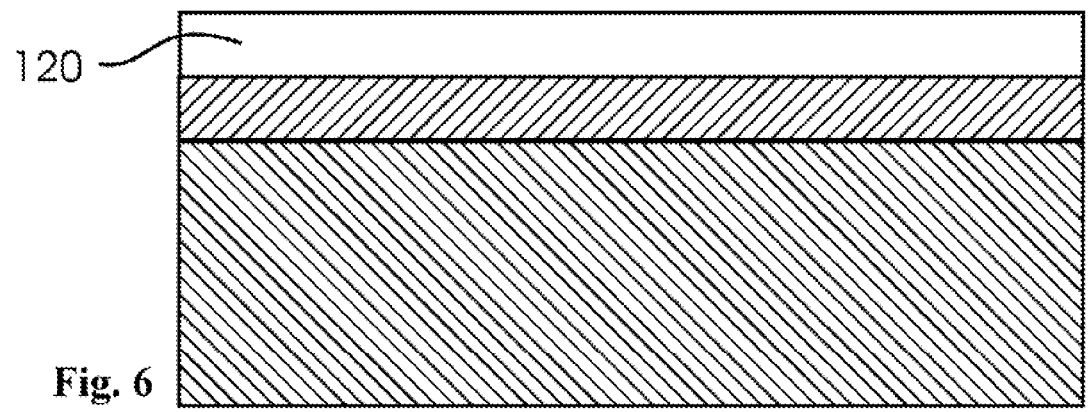
Figure 7:
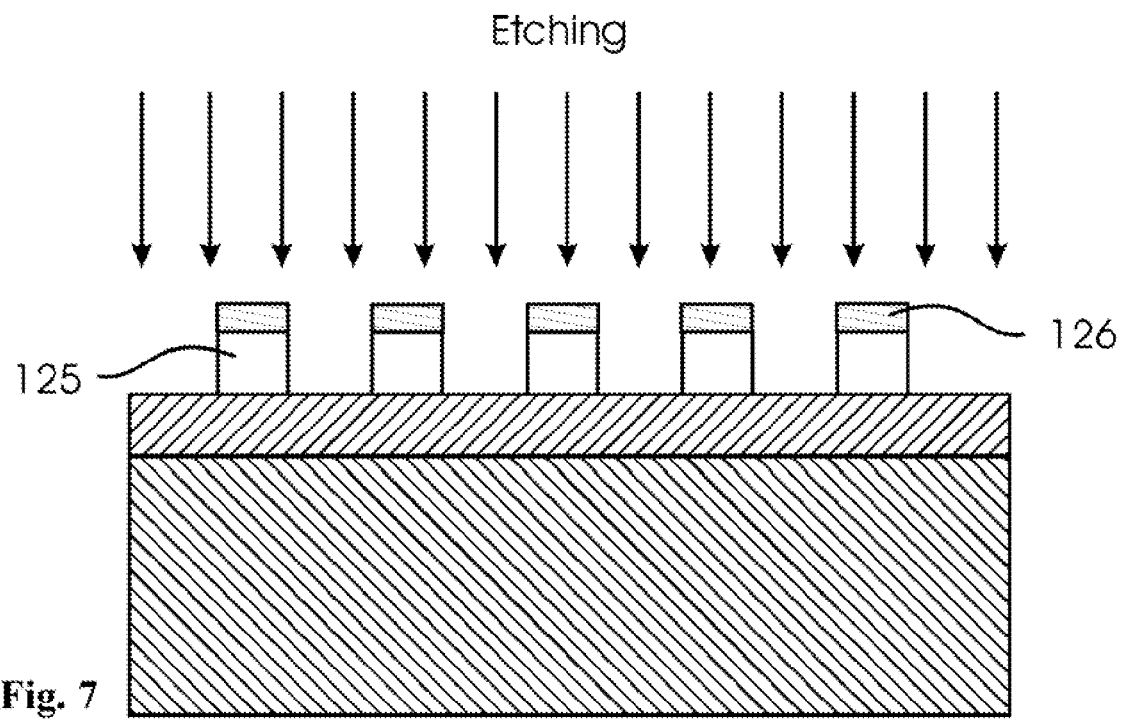

FIG. 6 shows a uniform film 120 of material B, (e.g., higher generation PAMAM dendrimer such as G4, G5, or G6) that is formed, by spin coating or by spray-deposition or by other suitable method, on top of the first layer 110. The higher generation dendrimer layer has a refractive index between 1.42 and 1.6. This film is patterned following a method described below to form the core of the waveguide 125 as shown in FIG. 7. The primary requirement of this layer 120 (material B) is that its refractive index must be slightly higher than that of the previous layer formed from material A. As such other nano-material that will satisfy the refractive index requirement can also be used to form the layer 120.

Referring to FIG. 7, the layer 120 is patterned by a dry etching process such as reactive ion etching (RIE) to form sharp walled ridges that forms the waveguide core 125 with an air gap 127 resulting between each pair of waveguide cores 125, where the refractive index of air is 1.0. Prior to etching a mask 126 is laid on the dendrimer layer 120. The mask is pre-written with the desired patterns and common photolithography with photo-resist steps is followed to develop the patterns on the film. Common mask aligner and stripping method can be used prior to reactive ion etching. Several cores are shown in FIG. 7 (5 instances), each core forming independent waveguides after cladding layers are deposited. However, any number of cores can be formed depending on application. For instance, for an eight channel RAWG, as many as 37-47 waveguides may be necessary (depending on a given design). Even higher number of waveguides is necessary for higher channel count devices.

Figure 8:
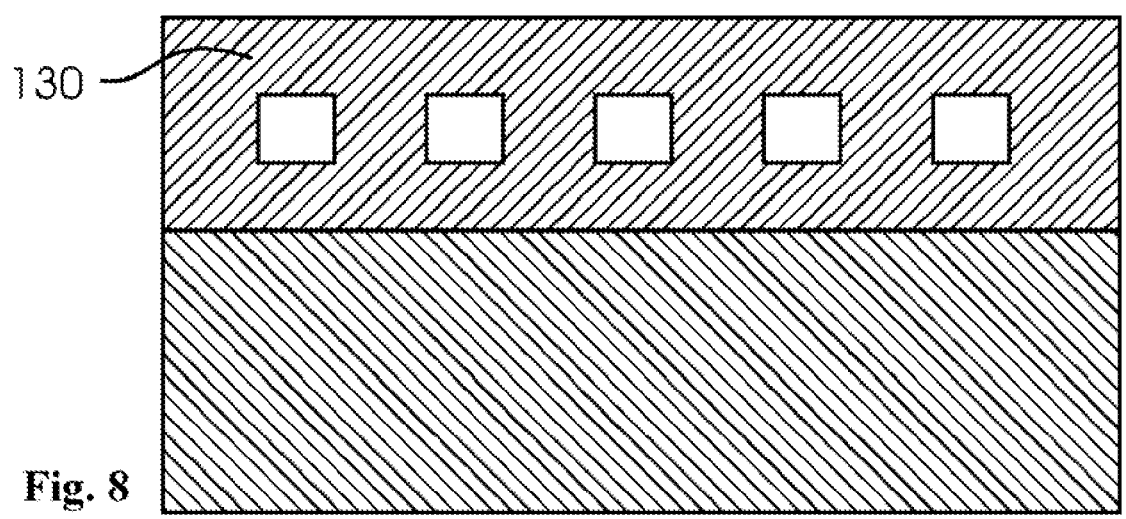

After the etching process is completed, the entire surface is coated with another layer of nano-material to fill-in the intra-ridge spaces created by the removal of dendrimers during etching. This layer 130, grown by depositing nano-material B by spin coating or by any other method suitable for the material, to form the cladding layer, as shown in FIG. 8.

Figure 9:
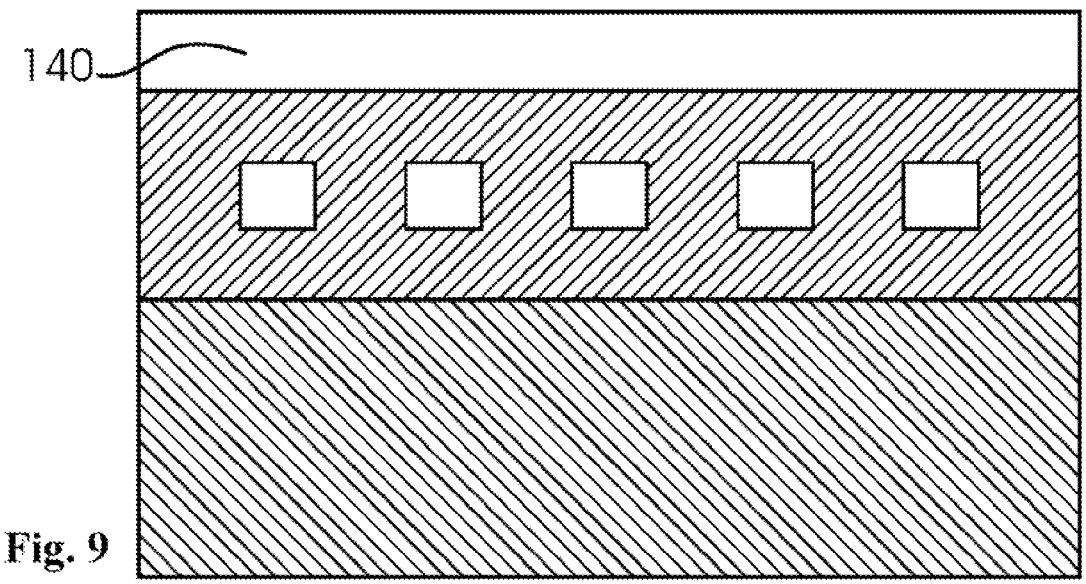

Finally a layer of film is deposited on the entire surface from a common polymeric material such as poly siloxane or may also be formed from nano-material plus silane. This layer 140 serves as a cover to protect the waveguide structure, and its refractive index is not specified (FIG. 9).

FIG. 10 shows a method of waveguide fabrication for optical amplification. Here NIC based waveguides are fabricated via the steps as described in FIGS. 4-9. A special arrangement is made to let the signal and pump laser in and out of the amplifier. Referring to FIG. 10, a Si wafer 200 is used as the substrate in the same fashion as substrate 100 in FIG. 3. Films of nano-materials are laid down in step-by-step sequence as was described for the waveguide fabrication with reference to FIGS. 4 through 9. However, a striking difference in waveguide for amplifier application is that the core material is chosen such that in addition to higher RI with respect to the cladding material it also contains rare-earth metals suitable for optical amplification. As depicted in FIG. 10, waveguides are fabricated such that an optical signal can be input in the amplifier via input port 210 and a pump laser can also be input via port 220. The ports 210 and 220 are fabricated such that there is enough space for attaching external single-mode fiber carrying these signals, as shown in FIG. 11.

Referring back to FIG. 10, the waveguide zone 230 serves as the area to combine the input signal and the pump which is then fed into the amplifying zone 240. The output signal is extracted from output port 250 that is composed of both amplifying signal and the pump signal that are separated via a WDM coupler and/or other arrangements. The amplifying action occurs via following mechanism.

When a pump laser is applied to the waveguide core 240, rare-earth metal ions (such as a single or mixed species of $Er^{3+}$, $Pr^{3+}$, $Nd^{3+}$, $Th^{3+}$, $Ho^{3+}$, $Tb^{3+}$, $Eu^{3+}$, and/or others) present in the core material are excited into its higher energy (excited) state by the absorption of the pump laser photon of appropriate energy range, then relaxes spontaneously into lower energy state from whence emission in the 1500-1600 nm range is stimulated by passing signal photons. The pump laser wavelength depends on the absorption characteristics of the amplifying ions. Referring to FIG. 12, for instance, $Er^{3+}$ has an energetic transition that emits at 1520 nm-1570 nm in most dielectric materials, thus causing amplification of signals in the C-band.

Other embodiments of the invention will be apparent to those skilled in the art from a consideration of this specification or practice of the invention disclosed herein; the scope and spirit of the invention being indicated by the following claims.

The invention claimed is:

1. A photonic waveguide comprising of:
a substrate,
a first layer of a nanomaterial,
a second layer of a nanomaterial,
a third layer of the first nanomaterial,
a fourth layer of an optical material,
wherein the second layer has a higher refractive index than the first layer,
wherein the third layer has the same refractive index as the first layer,
wherein the first layer is the bottom cladding,
wherein the second layer is the guiding layer,
wherein the third layer is the top cladding,
wherein the fourth layer is a cover layer,
wherein the second layer is patterned to form the core of the waveguide,
wherein the first and the third layers enclose the second layer, thus forming a waveguide,
wherein the waveguiding is accomplished by the natural index contrast (NIC) method where the NIC value is given by $$\Delta n = \frac{n_2 - n_1}{n_1} \times 100,$$

wherein $n_1$ is the refractive index of cladding layer and $n_2$ is the refractive index of the core layer,
wherein the NIC value has a range of >0% to ~240%,
wherein the guiding layer also has the ability to amplify an optical signal, thus, an amplifying layer,
wherein the guiding layer also has the ability to modulate an optical signal, thus a modulating layer,
wherein the guiding layer is doped with at least a first dopant to amplify an optical signal,
wherein the guiding layer is also doped with at least a second dopant to modulate an optical signal.

2. The waveguide of claim 1 wherein the waveguide can transmit light at least in the wavelength range of 1060 to 1650 nm.

3. The waveguide of claim 1 wherein the first layer comprises of a nanomaterial that is deposited on the said substrate by at least one method from spin-coating, spray deposition, chemical vapor deposition, etc.

4. The waveguide of claim 1 wherein the second layer comprises of a nanomaterial that is deposited on top of the said first layer of claim 3 by at least one method from spin-coating, spray deposition, chemical vapor deposition, etc.

5. The waveguide of claim 1 wherein the first layer is at least a dendrimer, a spin-on-glass, a nanosilica, a polymer, or a composition thereof.

6. The waveguide of claim 1 wherein the second layer is at least a dendrimer, a spin-on-glass, nanosilica, a polymer, or a composition thereof.

7. The waveguide of claim 1 wherein the thickness of the first layer is controlled at least by solution concentration, solution viscosity, solution pH, spin-coating parameters, and curing parameters.

8. The waveguide of claim 1 wherein the thickness of the second layer is controlled at least by solution concentration, solution viscosity, solution pH, spin-coating parameters, and curing parameters.

9. The waveguide of claim 1 wherein the patterned second layer comprises of a plurality of waveguides.

10. The waveguide of claim 1 wherein the second layer is comprised of at least one waveguide structure from a group of waveguide structures comprising of: linear waveguide, curved waveguide, circular waveguide, splitter, spiral waveguide, serpentine waveguide, branched waveguide, slab waveguide, parallel waveguide, converging waveguide, diverging waveguide, and interconnect waveguide.

11. The waveguide of claim 1 wherein the patterned second layer defines at least one device.

12. The waveguide of claim 1 wherein the substrate material comprises of at least one hard and non-flexible material from the group: silicon, glass, quartz, plastic, alumina, and ceramic.

13. The waveguide of claim 1 wherein the substrate material comprises of at least one soft and flexible material from the group: plastic, polyimide, pyrex, and polymer.

14. A photonic waveguide comprising of:
a substrate,
a first layer of a nanomaterial,
a second layer of a nanomaterial,
a third layer of the first nanomaterial,
a fourth layer of an optical material that forms a cover layer,
wherein the second layer having the ability to amplify an optical signal,
wherein the second layer has a higher refractive index than the first layer,
wherein the third layer has the same refractive index as the first layer,
wherein the first layer is the bottom cladding,
wherein the third layer is the top cladding,
wherein the first and the third layers enclose the second layer, thus forming a waveguide,
wherein the first layer and the second layer have refractive indices in a difference ratio to fall within a predetermined natural index contrast range,
wherein the NIC value has a range of >0% to ~240%,
wherein the second layer is an amplifying layer,
wherein the second layer is patterned to form the waveguide core, and pumped by a pump laser,
wherein the waveguide can amplify light at least in the wavelength range of 1060 to 1650 nm,
wherein the amplification wavelength range is tuned by choosing at least one rare-earth dopant species,
wherein the amplification efficiency is tuned at least by the concentration of the rare-earth metal ion incorporation in the second layer.

15. The waveguide of claim 14 wherein the pump and the signal are combined at least via a coupler.

16. The waveguide of claim 14 wherein the first layer is at least a dendrimer, spin-on-glass, nanosilica, polymer, or a composition thereof.

17. The waveguide of claim 14 wherein the second layer is at least a dendrimer, a spin-on-glass, a nanosilica, a polymer, or a composition thereof.

18. The waveguide of claim 14 wherein the second layer is incorporated with at least one rare-earth metal ion from a group comprising of: Erbium, Neodymium, Praseodymium, Thorium, Holmium, Terbium, Europium, and other rare-earth metal ions with a dendrimer.

19. The waveguide of claim 14 wherein the patterned second layer comprises of a plurality of waveguides.

20. The waveguide of claim 14 wherein the second layer is comprised of at least one waveguide structure from a group of waveguide structures comprising of: linear waveguide, curved waveguide, circular waveguide, splitters, spiral waveguide, serpentine waveguide, branched waveguide, slab waveguide, parallel waveguide, converging waveguide, diverging waveguide, and interconnect waveguide.

21. The waveguide of claim 14 wherein the patterned second layer defines at least one device.

22. The waveguide of claim 14 wherein the substrate material comprises of at least one hard and non-flexible material from the group: silicon, glass, quartz, plastic, alumina and ceramic.

23. The waveguide of claim 14 wherein the substrate material comprises of at least one soft and flexible material from the group: plastic, polyimide, pyrex, and polymer.

24. A photonic waveguide comprising of:
a substrate,
a first layer of a nanomaterial,
a second layer of a nanomaterial,
a third layer of the first nanomaterial,
a fourth layer of an optical material that forms a cover layer,
wherein the second layer having the ability to modulate an optical signal via increased electro-optic coefficient,
wherein the second layer has a higher refractive index than the first layer,
wherein the third layer has the same refractive index as the first layer,
wherein the first layer is the bottom cladding,
wherein the third layer is the top cladding,
wherein the first and the third layers enclose the second layer, thus forming a waveguide,
wherein the waveguide comprised of the first layer and the second layer have refractive indices in a ratio that fall within a predetermined natural index contrast range,
wherein the NIC value has a range of >0% to ~240%,
wherein the second layer is patterned to form the core of the waveguide,
wherein the second layer is a modulating layer,
wherein the waveguide can modulate light at least in the wavelength range of 1060 to 1650 nm.

25. The waveguide of claim 24 wherein the first layer is at least a dendrimer, a spin-on-glass, a nanosilica, a polymer, or a composition thereof.

26. The waveguide of claim 24 wherein the second layer is at least a dendrimer, a spin-on-glass, a nanosilica, a polymer, or a composition thereof.

27. The waveguide of claim 24 wherein the second layer is doped with at least one inorganic additive.

28. The waveguide of claim 24 wherein the second layer is doped with at least one organic additive such as a chromophore.

29. The waveguide of claim 24 wherein the patterned second layer comprises of a plurality of waveguides.

30. The waveguide of claim 24 wherein the second layer is comprised of at least one waveguide structure from a group of waveguide structures comprising of: linear waveguide, curved waveguide, circular waveguide, splitters, spiral waveguide, serpentine waveguide, branched waveguide, slab waveguide, parallel waveguide, converging waveguide, diverging waveguide, and interconnect waveguide.

31. The waveguide of claim 24 wherein the patterned second layer defines at least one device.

32. The waveguide of claim 24 wherein the substrate material comprises of at least one hard and non-flexible material from the group: silicon, glass, quartz, plastic, alumina and ceramic.

33. The waveguide of claim 24 wherein the substrate material comprises of at least one soft and flexible material from the group: plastic, polyimide, pyrex, and polymer.

34. The waveguide of claim 1 wherein the thickness of the third layer is controlled at least by solution concentration, solution viscosity, solution pH, spin-coating parameters, and curing parameters.

35. A photonic integrated circuit (PIC), comprising:
a first layer of nanomaterial with a first refractive index;
a second layer of nanomaterial with a second refractive index, wherein the second refractive index is greater than the first refractive index; and
a third layer of nanomaterial with a third refractive index, wherein the third refractive index is substantially the same as the first refractive index; wherein the first layer, the second layer and the third layer form at least one waveguide;
wherein the at least one waveguide is used as a building block for the PIC;
wherein the at least one waveguide forming the building blocks of the PIC, has the first layer and the second layer refractive indices in a ratio that satisfy a predetermined natural index contrast range; wherein the NIC value has a range of >0% to ~240%.

36. The photonic integrated circuit of claim 34, wherein the second layer is a guiding layer.

37. The photonic integrated circuit of claim 34, wherein the guiding layer is doped for signal amplification.

38. The photonic integrated circuit of claim 34, wherein the guiding layer is doped for signal modulation.

39. The photonic integrated circuit of claim 34, wherein the guiding layer has a dopant.

* * * * *